(12) United States Patent
Giessibl

(10) Patent No.: US 8,393,009 B2
(45) Date of Patent: Mar. 5, 2013

(54) SENSOR FOR NONCONTACT PROFILING OF A SURFACE

(76) Inventor: Franz Josef Giessibl, Pentling (DE)

( * ) Notice: Subject to any disclaimer, the term of this patent is extended or adjusted under 35 U.S.C. 154(b) by 0 days.

(21) Appl. No.: 13/300,749

(22) Filed: Nov. 21, 2011

(65) Prior Publication Data

US 2012/0131704 A1    May 24, 2012

(30) Foreign Application Priority Data

Nov. 23, 2010    (DE) .......................... 10 2010 052 037

(51) Int. Cl.
*G01B 13/16* (2006.01)
*G01Q 70/08* (2010.01)
*G01Q 60/24* (2010.01)

(52) U.S. Cl. .................... 850/1; 850/5; 850/33; 850/40; 850/56; 73/105

(58) Field of Classification Search ................. 850/1, 5, 850/33, 40, 56; 73/105
See application file for complete search history.

(56) References Cited

U.S. PATENT DOCUMENTS 5,418,363 A * 5/1995 Elings et al. ..................... 850/1
7,001,785 B1 * 2/2006 Chen ............................... 438/10
7,665,350 B2 * 2/2010 Giessibl ......................... 73/105

FOREIGN PATENT DOCUMENTS

DE    195 13 529 A1    10/1996
DE    196 33 546 A1    2/1998

* cited by examiner

*Primary Examiner* — Nikita Wells
(74) *Attorney, Agent, or Firm* — Roberts Mlotkowski Safran & Cole, P.C.; David S. Safran

(57) ABSTRACT

A sensor for scanning a surface with an oscillating cantilever (12), made from piezoelectric material that is suitable for a transverse oscillation of the free end of a beam, holding an electrically conductive probe tip (14) on the free end of the beam in transverse direction, a first deflection electrode (26A, 26B) and an inversely phased second electrode (28A, 28B, 28C) being provided to collect charges that are separated within the space of the deflection electrodes (34, 36). The cantilever (12) is provided with at least one electrode (30) in addition to the deflection electrodes (26A, 26B, 28A, 28B, 28C) that provides electrical contact to the tip (14), the at least one additional electrode being located in a region on the deflecting beam where the surface charge density due to the strain caused by beam deflection (34, 36) is smaller than in the region where the deflection electrodes are located.

16 Claims, 5 Drawing Sheets

SENSOR FOR NONCONTACT PROFILING OF A SURFACE

BACKGROUND OF THE INVENTION

1. Field of the Invention

The invention relates to a sensor for noncontact scanning of a surface with an oscillating beam made from a piezoelectric material, wherein the beam is designed for a transverse vibration of a free end of the beam, with an electrically conductive tip extending in transverse direction at the free end of the beam, wherein the beam is provided with a first deflection electrode and a second deflection electrode, which second deflection electrode is inversely polarized with regard to the first deflection electrode in order to collect charges that are generated when the beam is deflected. Such a sensor is, in particular, suitable for combined atomic force microscopy that is a combination of atomic force microscopy with other scanning probe microscopies. One example is combined scanning tunneling and atomic force microscopy.

2. Description of Related Art

Scanning probe microscopy works by scanning a sharp tip over a surface (in x- and y-direction) while keeping the interaction force between tip and sample constant by means of a feedback circuit that controls the tip height z such that an image z(x,y) is formed. Image contrast is defined by the tip-sample interaction. Two basic methods are distinguished: imaging with repulsive and imaging with attractive interactions. When the tip approaches the sample, the force is initially attractive. Once tip and sample "touch" each other, the force becomes repulsive. Scanning tunneling microscopy relies on a similar principle, but it requires electrically conductive tips and samples. Instead of the force, a current is measured (from about 100 fA to about 1000 nA), that flows once a voltage bias is applied and the distance between tip and sample is sufficiently small (between 0.2 nm and 2 nm).

The force is measured by mounting the probe tip onto a cantilever spring. In quasi-static force microscopy, the static spring deflection is measured. In dynamic force microscopy, the cantilever oscillates and an observable, such as the oscillation amplitude, the frequency or the oscillation phase with respect to a sinusoidal drive signal are measured. In principle, it is possible to simultaneously measure the force (or a quantity derived from it such as the force gradient), by measuring the deflection of the cantilever or a quantity derived from the deflection as well as the tunneling current that flows between tip and sample.

FIG. 1 is a schematic view of a known sensor for simultaneous tunneling- and force microscopy. The sensor (stiffness k) oscillates at amplitude A. The unperturbed resonance frequency is $f_0=(k/m^*)^{0.5}/2\pi$, and the frequency changes to $f=((k+\langle k_{ts}\rangle)/m^*)^{0.5}/2\pi$. The influence of a tip-sample force gradient $\langle k_{ts}\rangle$ leads to a frequency shift $$\Delta f = \langle k_{ts}\rangle/(2k)f_0, \quad (G1.1)$$

where m* is the effective mass of the cantilever. The frequency shift can be used as a feedback signal to control the distance of a probe tip that scans the sample. When both tip and sample are electrically conductive and a bias voltage is applied, a tunneling current flows that is modulated by the oscillation and contains important information about the sample. With metallic tips and samples, the tunneling resistance of the vacuum gap is approximately given by 12.9 k$\Omega$×exp(−2 z/100 pm). A simultaneous measurement of force and current is desirable, because that extends the applicability of scanning probe microscopy.

Piezoelectric sensors, such as the qPlus Sensor (see, e.g., German Patent DE 196 33 546 C2 and F. J. Giessibl, *Applied Physics Letters* 73, 3956, 1998 and F. J. Giessibl, *Applied Physics Letters* 76, 1470, 2000) and the so-called needle sensor (see, e.g. K. Bartzke et al., International Journal of Optoelectronics 8, Nos. 5/6, 669-676, 1993; T. An et al. Appl. Phys. Lett. 87, 133114, 2005) are formed of a quartz beam, whose lateral deflection (qPlus) or length extension (needle sensor) is measured by means of the piezoelectric effect. The quartz beam is covered by two pairs of electrodes (qPlus) or two single electrodes (needle sensor), that collect charges for a constant deflection and generate an alternating current when oscillating.

The qPlus sensor 10 shown schematically in FIG. 2 utilizes the beam deflection, where a deflectable beam 12 with a tip 14 is mounted to a base part in rest. The piezoelectric effect transforms mechanical strain caused by deflection to surface charges that are collected by the electrodes that cover the quartz beam. When the beam is deflected upwards as shown in FIG. 2, the upper half of the beam is subject to tensile strain, the lower half to compressive strain.

The emergence of a surface charge density $\sigma_{el}$ with the presence of a mechanical stress $\sigma_{mech}$ is due to the piezoelectric effect, where the surface charge density is given by:

$$\sigma_{el}=d_{12}\sigma_{mech}. \quad \text{(eq. 1)}$$

The prefactor $d_{12}$ is the piezoelectric coupling constant with a typical value of about 2.3 pC/m for quartz. The mechanical strain leads to surface charges, that are collected by electrodes and transferred to an amplifier. The geometric arrangement of the electrodes is chosen such that a maximal charge is delivered for a given bending symmetry in order to obtain a maximal signal-to-noise ratio in deflection measurement. The basically sinusoidal deflection transforms into a basically sinusoidal alternating current.

When intending to measure the tunneling current in parallel, the electrically conductive tip needs to be connected to the outside. Prior art (F. J. Giessibl, *Applied Physics Letters* 76, 1470, 2000) utilizes one electrode of the quartz beam to guide the tunneling bias voltage to the tip. The tunneling current is collected at the sample. One disadvantage of this arrangement is that the tunneling current needs to be collected at the sample and deflection signal and a galvanic separation between deflection signal and tunneling current is not feasible. The sample needs to be electrically isolated from the body of the scanning probe microscope. This is a clear disadvantage, in particular in low-temperature microscopes, because the sample should be thermally connected well to the cooling bath to allow for low sample temperatures. As stated by the Wiedemann-Franz law, a good electrical connection ensures a good thermal connection and vice versa. In addition, the sample and the sample holder are generally much larger than the tunneling tip, therefore they have a larger electrical capacity with respect to ground (typically tens of pico-Farads). Large capacity to ground has the disadvantage of limiting the bandwidth of the tunneling current measurement and increasing its noise figure.

German Patent Application DE 195 13 529 A1 relates to a needle sensor, that contains a drive electrode on opposite faces of the beam to drive the beam into resonant vibration. One of the faces contains an additional electrode that connects to the tip to enable tunneling current measurement.

SUMMARY OF THE INVENTION

It is an object of the invention to create a sensor that is suitable for scanning force and scanning tunneling microscopy and avoids the above-mentioned disadvantages and is simple and cost effective in manufacturing, allows for a high spatial resolution in the atomic regime and is reliable in operation.

According to the invention, this object is achieved by a sensor for noncontact scanning of a surface having an oscillating beam made from a piezoelectric material, wherein the beam is designed for transverse vibration of a free end of the beam, with an electrically conductive tip extending in a transverse direction at the free end of the beam, wherein the beam is provided with a first deflection electrode and a second deflection electrode, the second deflection electrode being inversely polarized with respect to the first deflection electrode in order to collect charges that are generated when the beam is deflected, wherein the beam is provided with at least one additional electrode that connects the tip electrically, and wherein the additional electrode is located in an area where a density of surface charges generated by deflection of the beam is lower than in a vicinity of the deflection electrodes.

The invention is beneficial in that, by the beam containing one or more electrodes in addition to the deflection electrodes, additional functions can be implemented. For example, the tip can be contacted electrically to allow for a measurement of the tunneling current. The supplemental electrode is located in a region on the beam that contains a lower surface charge density during deflection to ensure small cross talk between deflection measurement and tunneling current, to enable a galvanic separation between deflection signal and tunneling current and to enable grounding of the sample; furthermore, the supplemental electrode sensor can be mounted on the sensor in an easy and reliable fashion, simplifying the manufacturing process of the sensor. This further enables high bandwidth and low noise measurements of the tunneling current. The sensor be applied not only in combined scanning tunneling and scanning force microscopy, but also in force microscopy combined with thermometry, in force microscopy combined with highly localized writing of magnetic information and in force microscopy combined with magnetometry.

These and further objects, features and advantages of the present invention will become apparent from the following description when taken in connection with the accompanying drawings which, for purposes of illustration only, show several embodiments in accordance with the present invention.

DETAILED DESCRIPTION OF THE INVENTION

Figure 1:
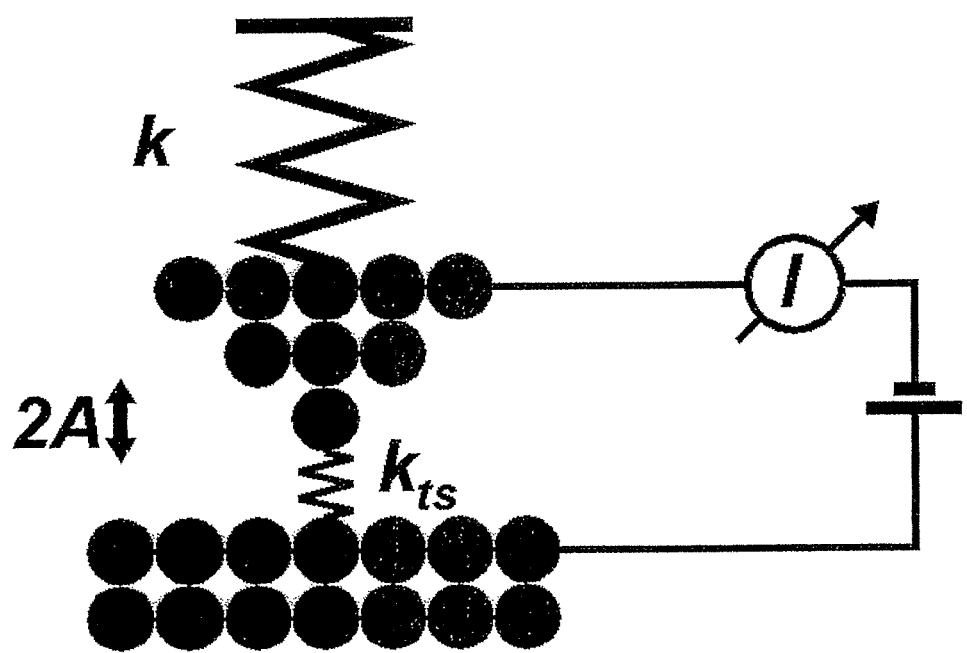
FIG. 1 is a schematic view of a known sensor for simultaneous scanning tunneling and scanning force microscopy.
Figure 2:
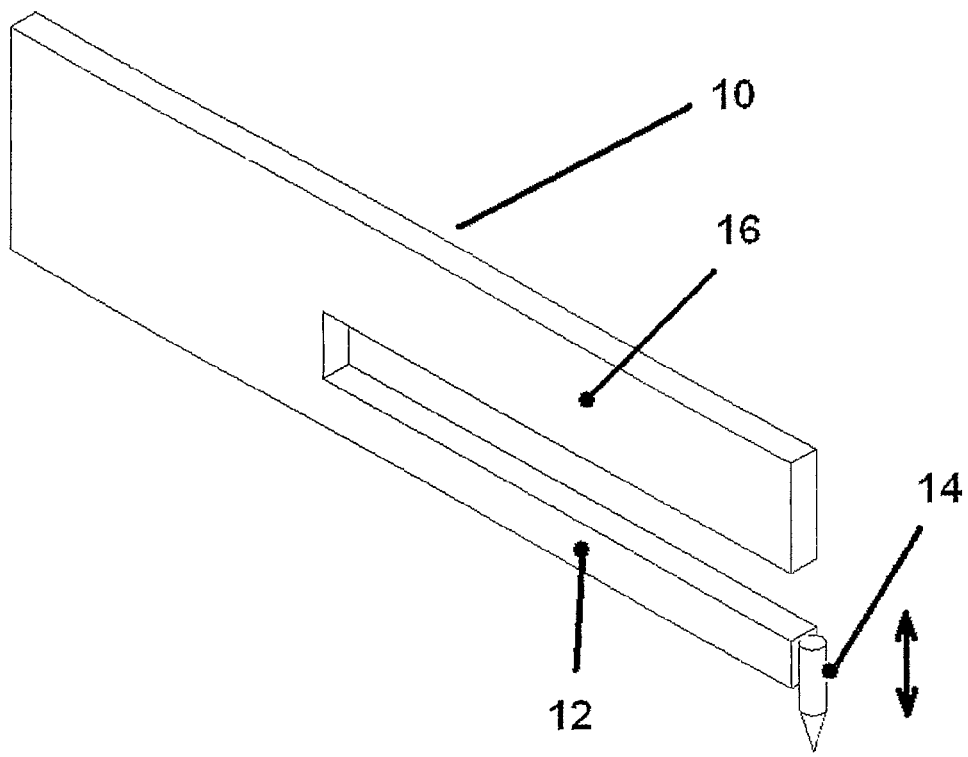
FIG. 2 is a schematic perspective view of a known qPlus-sensor.

FIG. 2 shows an example of the invented sensor 10, that contains an oscillating beam made from piezoelectric material, holding an electrically connected tip 14 at its free end that points in a transverse direction. Beam 12 is one prong of a U-shaped tuning fork configuration, while beam 16 serves to mount the sensor 10 to a scanning unit (see, FIG. 5) that scans the sensor 10 across a surface 20 of a sample 22. Unit 18 contains a driver 24 that drives beam 12 and its free end with tip 14 into transverse oscillations (see, arrow 15).

The cross-section of beam 12 is rectangular, according to FIG. 4, and the two horizontal sides hold a first part 26A and a second part 26B of one of the two deflection electrodes, i.e., the two electrode sections 26A, 26B together constitute the first deflection electrode (in the following, we denote those side faces of beam 12 as vertical, that align with the direction of oscillation, e.g., that are parallel to the plane of vibration, while we denote those side faces of beam 12 as horizontal, that are aligned perpendicular to the oscillation, i.e., perpendicular to the plane of vibration). Both vertical faces contain a first part 28A and a second part 28B and 28C of a second deflection electrode that has an oscillation phase opposite to the first deflection electrode. The second part of the second deflection electrode is split in two parts 28B and 28C, leaving enough room between parts 28A and 28B to allow for a supplemental electrode 30A that can be used to carry the tunneling current. The tunneling current supplemental electrode 30A extends in the center of at least one of the two vertical faces of beam 12 in an axial direction (deflection electrode 28C could also be split into electrodes 28C and 28D, similar to electrodes 28A and 28B, to allow space for an additional supplemental electrode 30B; see, FIG. 4B). Additionally, supplemental electrodes 30A and 30B could be split up additionally to provide four supplemental electrodes 30A, B, C and D as shown in FIG. 4C.

Figure 3:
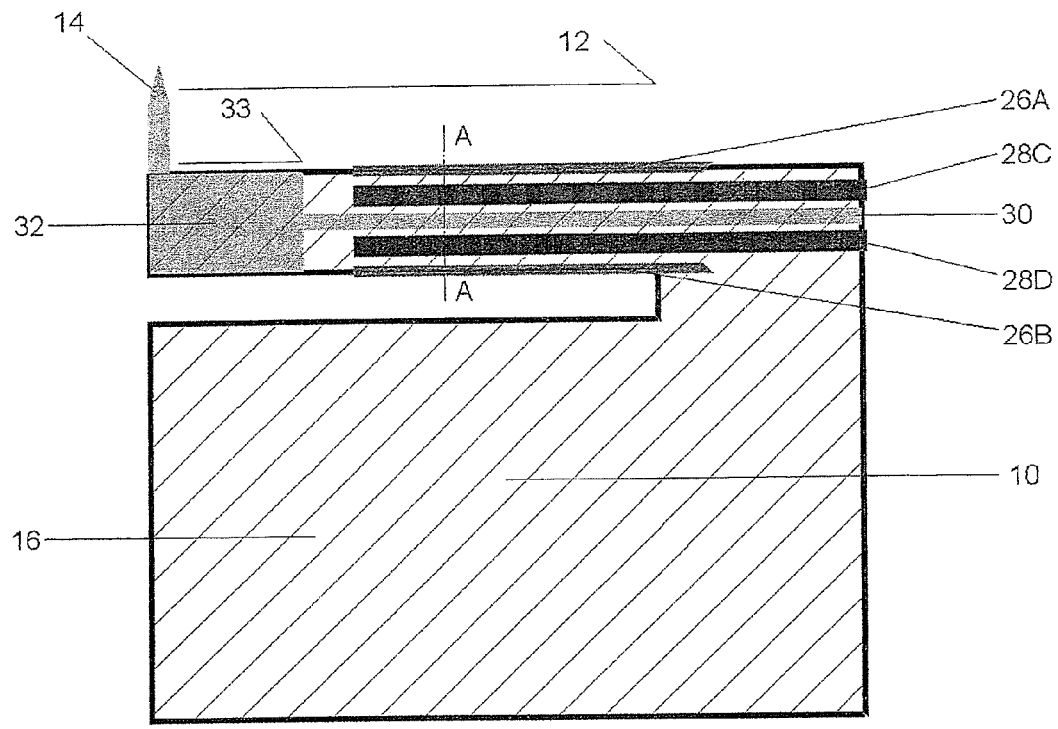
FIG. 3 is a schematic view of one embodiment of the sensor according to the invention.

In the example shown in FIG. 3, the supplemental electrode 30 has a wider part 32 in an area close to the tip 14 of the lateral face than further away from tip 14, where the supplemental electrode is located between deflection electrodes 28B, 28C. The parts of the deflection electrode 28B, 28C (as well as part 28A of the second deflection electrode 28 and parts 26A, 26B of the first deflection electrode 26) do not extend to the area close to the tip 14, where the vertical extension of the tunneling current electrode 30 is increased.

The tunneling current supplemental electrode 30 does not extend across the horizontal faces of the beam where the two parts 26A, 26B of the first deflection electrode 26 are located, except for the area 33 close to the tip 14. Because the tip 14 is located on the top horizontal face, the tunneling current electrode 30 needs to extend on the horizontal face close to the tip.

Figure 4A:
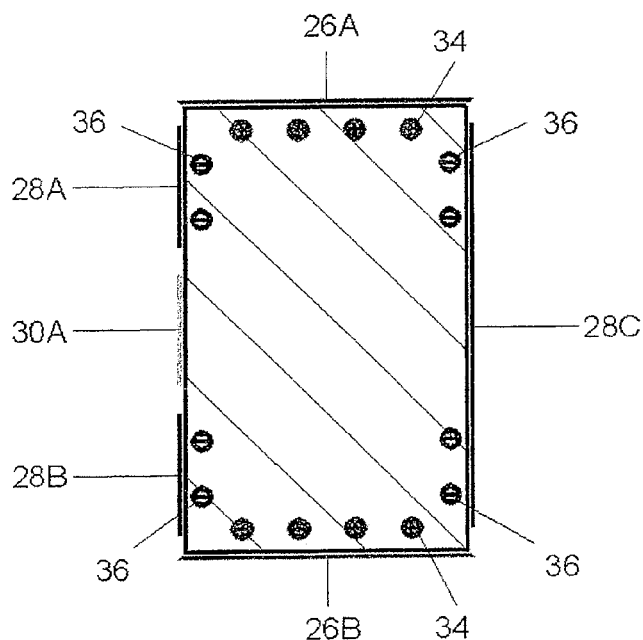
FIGS. 4A-C are schematic cross-sectional views of the sensor shown in FIG. 3 taken along line A-A with one (FIG. 4A), two (FIG. 4B) and four supplemental electrodes (FIG. 4C)
Figure 4B:
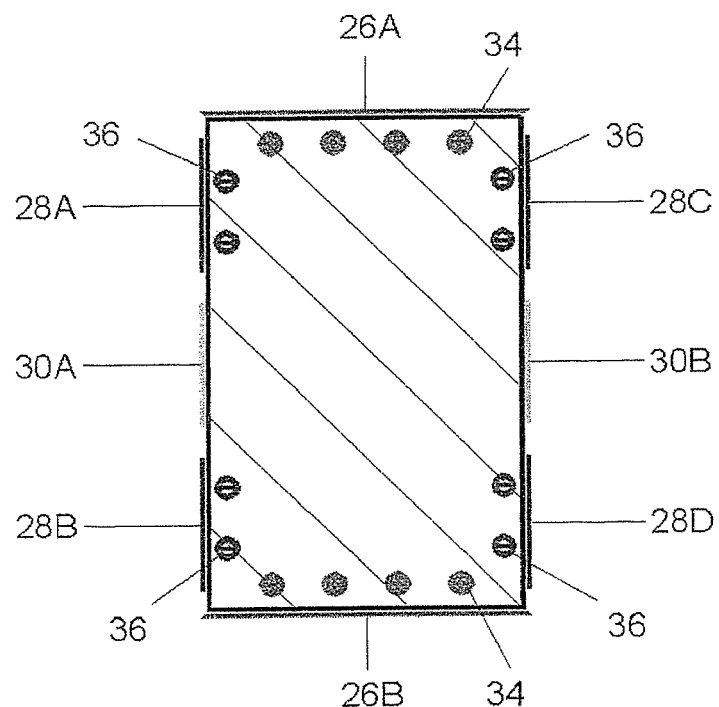
Figure 4C:
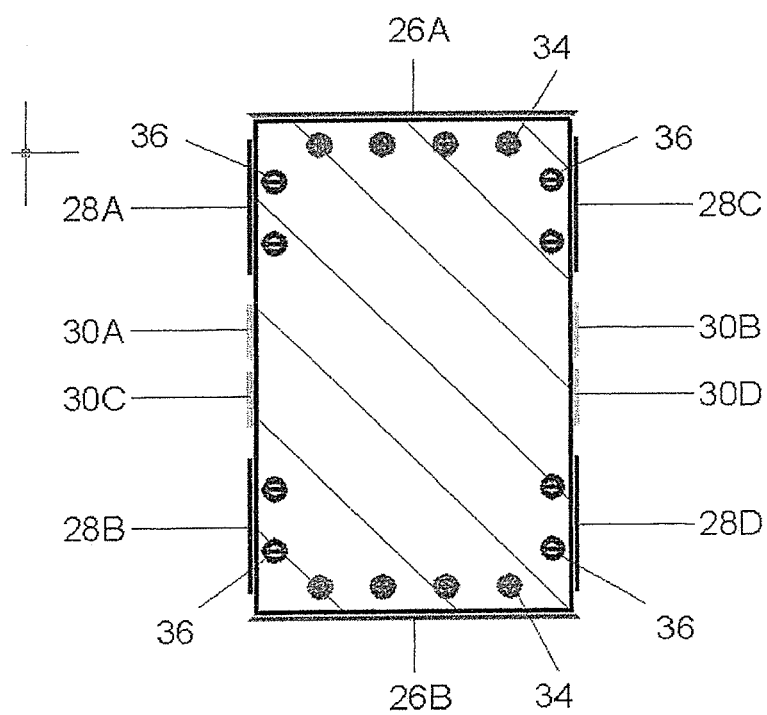

The two parts 26A, 26B of the first deflection electrode 26 preferentially extend across the complete area of the two horizontal faces of beam 12 (except, as said above, in the area close to the tip), where parts 28A, 28B and 28C of the second deflection electrode 28 preferentially extend at least across the edges of both vertical faces of beam 12 (in the examples shown in FIGS. 4A-4C, part 28A of the second deflection electrode extends, in general, completely over that vertical face of beam 12 where the tunneling current electrode 30 is not located, except as stated above within the area close to the tip 33). In the example according to FIG. 3, the first deflection electrode 26A, 26B extends in an axial direction along the two vertical faces of beam 12, except at least for the part covered by the tunneling current electrode 30.

The area 33 on beam 12 close to the tip 14, where the tunneling current electrode 30 makes contact to the tip 14 that is kept clear of the two deflection electrodes, typically does not cover more than 25% of the length of beam 12. In the dynamic deflection of the beam, the part of the beam that is close to the fixing point (i.e., the right part in FIGS. 3 and 5) is subject to the greatest mechanical strain. Therefore, it is sufficient for the deflection electrodes to cover the first 75% of the length of the beam referenced from the fixing point.

FIGS. 4A-4C illustrate the reason for the arrangement of 26A, 26B, 28A, 28B, 28C and 30. When beam 12 bends in a transverse direction up or down, the surface charges arise, in particular, on the two side faces; in the example of FIGS. 4A-4C, positive charges 34 pile up on the side faces, while negative charges pile up at the edges and at the two horizontal faces. The positive charges 34 are collected by the first deflection electrode, i.e., from parts 26A, 26B, while the negative charges are collected by electrodes 28A-28C. The area that is covered by the tunneling current electrode is only subject to a much lower surface charge density than within the area of the deflection electrodes 26, 28. Preferentially, the tunneling electrode is positioned in an area where the surface strains, and thus the charge density, is not more than 10% of the area where the maximal charge density occurs.

Figure 5A:
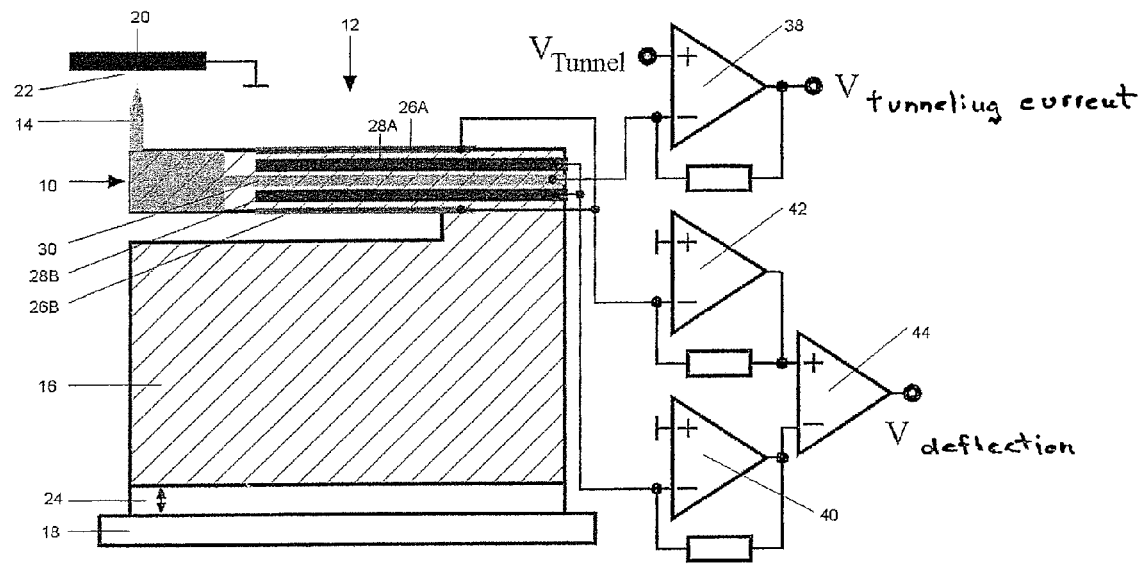
FIGS. 5A-C are views of the sensor according to the invention shown in FIG. 3 with a schematic representation of an example of an electric wiring diagram with a combined force and tunneling current sensor (FIG. 5A), a version with integrated tip heating enabling the generation of locally highly confined magnetic fields (FIG. 5B), a version with a combined force and temperature sensor (FIG. 5C) and a version with a combined force and Hall sensor to measure magnetic fields (FIG. 5D).

FIG. 5A shows an example for the wiring of sensor 10, where the sample 20 is at ground potential. The tunneling current electrode is connected to input 1 of a current-to-voltage converter 38, its input 2 is connected to the tunneling bias voltage $V_{Tunnel}$ and its output generates a voltage that is proportional to the tunneling current plus the tunneling voltage. By subtracting the tunneling bias voltage from that signal with a differential amplifier, a signal is produced that increases with decreasing distance between tip 14 and sample surface 22 of sample 20.

The signal that is taken from the first deflection electrode 26A, 26B is fed into the input and the signal that is taken from the second deflection electrode 28A, 28B, 28C respectively are fed into current-to-voltage amplifiers 40, 42. The outputs of amplifiers 40, 42 are connected to a differential amplifier 44 that delivers an output voltage $V_{detection}$ which is, by means of the information provided by the deflection of beam 12 and the charge generation in deflection electrodes 26A, 26B, 28A, 28B, 28C, a measure of the distance between tip 14 and sample surface 22.

The voltages $V_{tunneling\ current}$ and $V_{deflection}$ establish the parameters measured by sensor 10 that are typically measured with vertical adjustment of the Tipp 14 and the sample surface 22 respectively and are fed into unit 24.

In the example shown in FIG. 5A, the sample 20 is at ground potential. Alternatively, the sample 20 can be connected to $V_{Tunnel}$. The tunneling current electrode 30 could be fixed to tunneling potential and the tunneling current could be taken from the sample 20 by means of a current-to-voltage converter.

It is also possible to ground one of the deflection electrodes or to set one of them at another fixed potential and to source the current from one of the deflection electrodes. Generally, the invention allows great flexibility in arranging the signal paths.

Figure 5B:
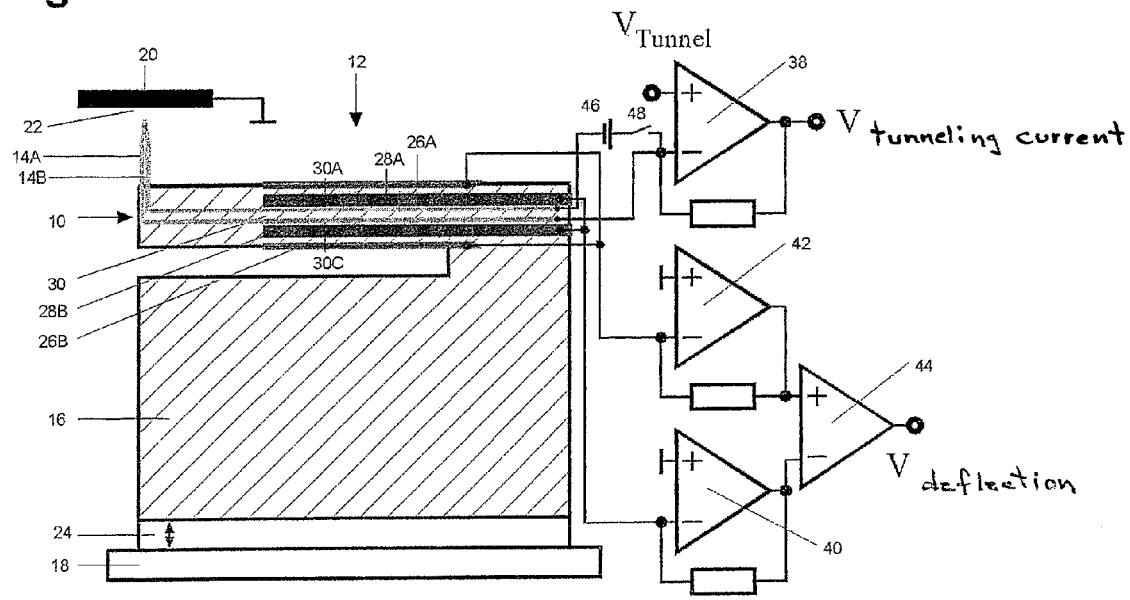

In the example shown in FIG. 5B, the sensor is supplied with two supplemental electrodes 30A, 30B, as shown in cross section FIG. 4B (although the electrodes are located on opposite faces of the beam as shown in FIG. 4B, the schematic side view from FIG. 5B displays both electrodes 30A, 30B to display the electrical connection scheme). The tip 14 consists of two wires 14A and 14B that are connected at their ends. By means of a voltage source 46 and a switch 48, a current can be fed through tip wires that heat the tip and can thus clean the tip. Also, due to Ampere's law, a current passed through the wire generates a magnetic field. By using a very small wire diameter of only a few nanometers (such as a carbon nanotube), even small currents can produce significant magnetic fields. After heating the tip 14, at least one of the electrodes 30A, 30B is used for current measurements.

Figure 5C:
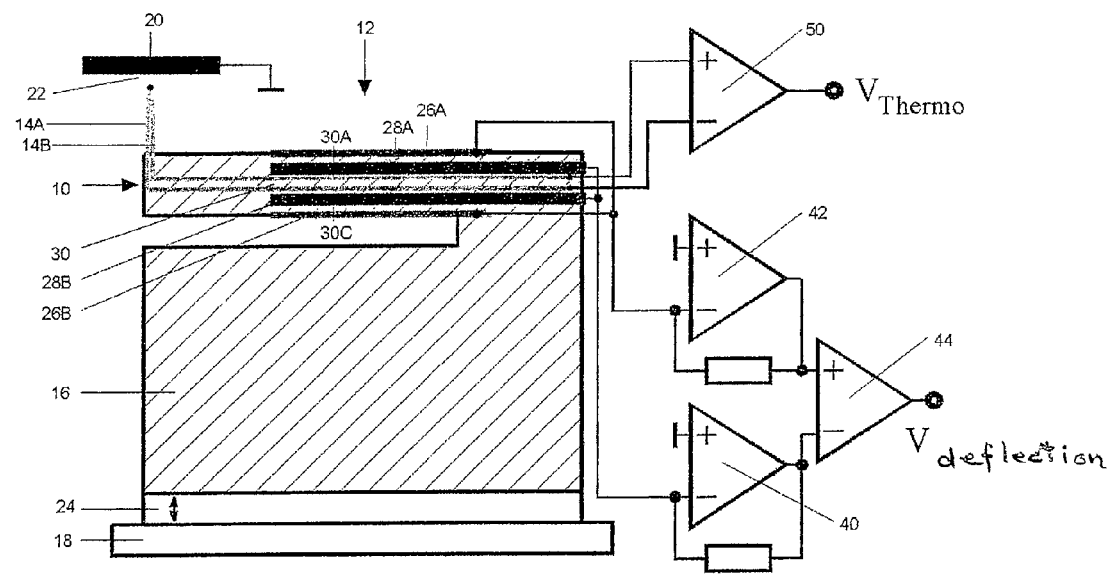

FIG. 5C displays a different wiring scheme of the sensor with two additional electrodes (although the electrodes are located on opposite sides of the beam as shown in FIG. 4B, the schematic side view FIG. 5C displays electrodes 30A, 30B to illustrate the wiring scheme). The tip is also a thermocouple, where tip wires 14A, 14B are made of different materials, e.g., chromium and nickel. Thus, a thermocouple is created where the thermal voltage is sensed through electrodes 30A, 30B and is amplified via differential amplifier 50 to a thermal voltage.

Figure 5D:
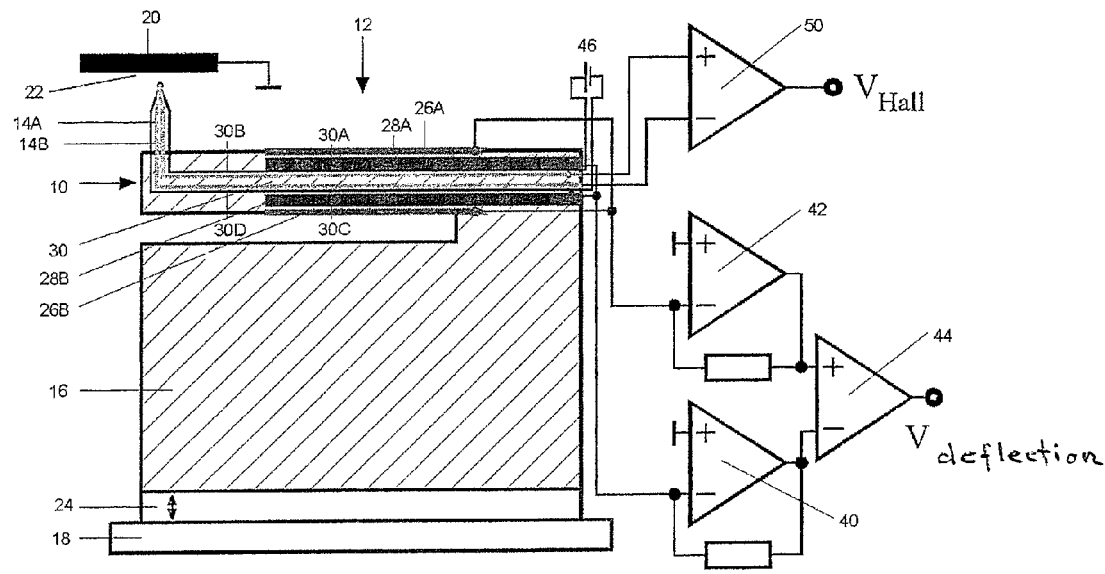

FIG. 5D shows an example, where all four additional electrodes shown in FIG. 4C are utilized (although the electrodes are located on opposite sides of the beam as shown in FIG. 4C, the schematic side view FIG. 5D displays all four electrodes 30A, 30B, 30C and 30D to illustrate the wiring scheme). The tip is connected by the four electrodes 30A-30D, enabling a Hall geometry as a tip. Power source 46 drives a current via electrodes 30B, 30D. When the tip is immersed into a magnetic field, a Hall voltage develops perpendicular to the current flow that can be sensed through electrodes 30A, 30C and is amplified by means of a differential amplifier. Thus, magnetic fields can be measured at very high spatial resolution.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as encompassed by the scope of the appended claims.

What is claimed is:

1. A sensor for noncontact scanning of a surface, comprising:
    an oscillating beam made of a piezoelectric material, the beam being constructed in manner enabling transverse vibration of a free end of the beam,
    an electrically conductive tip at the free end of the beam and which extends in transverse direction,
    wherein the beam is provided with a first deflection electrode and a second deflection electrode, the second deflection electrode being inversely polarized relative to the first deflection electrode to collect charges that are generated when the beam is deflected, and
    wherein the beam is provided with at least one additional electrode that connects the tip electrically, the additional electrode being located in an area where a density of surface charges generated by deflection of the beam is lower than in a vicinity of the deflection electrodes.

2. The sensor of claim 1, wherein the location and configuration of the additional electrode are adapted to cause a charge collected upon vibration of the beam to be no more than 1/10th of a charge collected at the deflection electrodes.

3. The sensor of claim 1, wherein the beam has a rectangular cross section, and wherein the additional electrode extends axially in a center of one of two side faces that are parallel to a plane of vibration of the beam.

4. The sensor of claim 3, wherein the additional electrode does not extend along faces of the beam that are perpendicular to a plane of vibration of the beam except for a region close to the tip.

5. The sensor of claim 3, wherein the additional electrode does not extend along faces of the beam that are perpendicular to a plane of vibration of the beam.

6. The sensor of claim 3, wherein a first portion of the additional electrode on region of the face parallel to the plane of vibration of the beam that is close to the tip is larger than a second portion of the additional electrode on a region of the face parallel to the plane of vibration that is further away from the tip that said first portion.

7. The sensor of claim 3, wherein the first deflection electrode extends axially along two faces of the beam that are perpendicular to a plane of vibration of the beam, wherein the second deflection electrode extends axially along two side faces of beam that are parallel to the plane of vibration of the beam, and wherein at least an area of the additional electrode remains clear of said second deflection electrode.

8. The sensor of claim 7, wherein the first deflection electrode extends substantially across the entire area of the side faces of beam, except for a region close to the tip, and wherein the second deflection electrode extends at least in corner regions of side faces of the beam that are parallel to the plane of vibration of the beam, except for a region close to the tip.

9. The sensor of claim 7, wherein the second deflection electrode extends substantially completely over that one of side faces of beam parallel to the plane of vibration of the beam which is not provided with the additional electrode.

10. The sensor of claim 1, wherein the beam forms a free arm of a U-shaped tuning fork arrangement, and wherein the second arm is designed to fix the sensor to a scanning unit.

11. The sensor of claim 1, wherein the additional electrode is a tunneling current electrode for measuring of a tunneling current that flows between the tip and the surface.

12. A device for noncontact scanning of a surface, comprising:
    a sensor for noncontact scanning of a surface, having:
        an oscillating beam made of a piezoelectric material, the beam being constructed in manner enabling transverse vibration of a free end of the beam,
        an electrically conductive tip at the free end of the beam and which extends in transverse direction,
        wherein the beam is provided with a first deflection electrode and a second deflection electrode, the second deflection electrode being inversely polarized relative to the first deflection electrode to collect charges that are generated when the beam is deflected, and
        wherein the beam is provided with at least one additional electrode that connects the tip electrically, the additional electrode being located in an area where a density of surface charges generated by deflection of the beam is lower than in a vicinity of the deflection electrodes
    a scanning unit for positioning the sensor with respect to a sample surface, and
    means to excite the beam into vibration.

13. A method for noncontact scanning of a surface by means of a sensor, comprising the steps of:
    providing a sensor having:
        an oscillating beam made of a piezoelectric material, the beam being constructed in manner enabling transverse vibration of a free end of the beam,
        an electrically conductive tip at the free end of the beam and which extends in transverse direction,
        wherein the beam is provided with a first deflection electrode and a second deflection electrode, the second deflection electrode being inversely polarized relative to the first deflection electrode to collect charges that are generated when the beam is deflected, and
        wherein the beam is provided with at least one additional electrode that connects the tip electrically, the additional electrode being located in an area where a density of surface charges generated by deflection of the beam is lower than in a vicinity of the deflection electrodes;
    setting the beam into a resonant transverse vibration,
    scanning the sensor across a surface of a sample by means of a scanning unit, and
    using at least one of a voltage between the deflection electrodes and a tunneling current that flows through the additional electrode to measure a distance between the tip and the surface.

14. A method for noncontact scanning of a surface by means of a sensor comprising the steps of:
    providing a sensor having:
        an oscillating beam made of a piezoelectric material, the beam being constructed in manner enabling transverse vibration of a free end of the beam,
        an electrically conductive tip at the free end of the beam and which extends in transverse direction,
        wherein the beam is provided with a first deflection electrode and a second deflection electrode, the second deflection electrode being inversely polarized relative to the first deflection electrode to collect charges that are generated when the beam is deflected, and
        wherein the beam is provided with a plurality of additional electrodes that connect the tip electrically, the additional electrodes being located in areas where a density of surface charges generated by deflection of the beam is lower than in a vicinity of the deflection electrodes;
    setting the beam into a resonant transverse vibration,
    scanning the sensor across a surface of a sample by means of a scanning unit,
    using a voltage between the deflection electrodes to measure a distance between the tip and the surface, and
    using two of the additional electrodes are for measuring a thermal voltage at the tip.

15. A method for noncontact scanning of a surface by means of a sensor comprising the steps of:
    providing a sensor having:
        an oscillating beam made of a piezoelectric material, the beam being constructed in manner enabling transverse vibration of a free end of the beam,
        an electrically conductive tip at the free end of the beam and which extends in transverse direction,
        wherein the beam is provided with a first deflection electrode and a second deflection electrode, the second deflection electrode being inversely polarized relative to the first deflection electrode to collect charges that are generated when the beam is deflected, and
        wherein the beam is provided with a plurality of additional electrodes that connect the tip electrically, the additional electrodes being located in areas where a density of surface charges generated by deflection of the beam is lower than in a vicinity of the deflection electrodes;
    setting the beam into a resonant transverse vibration,
    scanning the sensor across a surface of a sample by means of a scanning unit, using a voltage between the deflection electrodes to measure a distance between the tip and the surface, and using four of the additional electrodes for at least one of generating a Hall voltage at the tip and measuring a Hall voltage at the tip.

16. A method for noncontact scanning of a surface by means of a sensor comprising the steps of:

providing a sensor having:

an oscillating beam made of a piezoelectric material, the beam being constructed in manner enabling transverse vibration of a free end of the beam, an electrically conductive tip at the free end of the beam and which extends in transverse direction, wherein the beam is provided with a first deflection electrode and a second deflection electrode, the second deflection electrode being inversely polarized relative to the first deflection electrode to collect charges that are generated when the beam is deflected, and wherein the beam is provided with a plurality of additional electrodes that connect the tip electrically, the additional electrodes being located in areas where a density of surface charges generated by deflection of the beam is lower than in a vicinity of the deflection electrodes;

setting the beam into a resonant transverse vibration, scanning the sensor across a surface of a sample by means of a scanning unit, using a voltage between the deflection electrodes to measure a distance between the tip and the surface, and using two of the additional electrodes to apply a current to the tip for at least one of heating the tip and generating a magnetic field at the tip.

* * * * *